United States Patent
Ikegaya et al.

(10) Patent No.: US 11,066,142 B2
(45) Date of Patent: Jul. 20, 2021

(54) OUTBOARD MOTOR

(71) Applicant: YAMAHA HATSUDOKI KABUSHIKI KAISHA, Iwata (JP)

(72) Inventors: Yuki Ikegaya, Shizuoka (JP); Satoru Hamada, Shizuoka (JP); Takahiro Oguma, Shizuoka (JP); Akihiro Onoue, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 16/918,002

(22) Filed: Jul. 1, 2020

(65) Prior Publication Data
US 2021/0001968 A1 Jan. 7, 2021

(30) Foreign Application Priority Data

Jul. 5, 2019 (JP) .............................. JP2019-126057

(51) Int. Cl.
*B63H 20/14* (2006.01)
(52) U.S. Cl.
CPC .................................. *B63H 20/14* (2013.01)
(58) Field of Classification Search
CPC ...................................................... B63H 20/14
See application file for complete search history.

(56) References Cited

U.S. PATENT DOCUMENTS

| | | | | |
|---|---|---|---|---|
| 3,487,803 A | * | 1/1970 | Alexander, Jr. | ........ B63H 21/28 440/75 |
| 4,747,795 A | | 5/1988 | Kawamura et al. | |
| 9,908,604 B2 | * | 3/2018 | Sugiyama | .............. B63H 23/30 |
| 10,239,598 B2 | * | 3/2019 | Jaszewski | .............. B63H 20/28 |
| 2015/0013486 A1 | | 1/2015 | Kubo et al. | |
| 2016/0176492 A1 | | 6/2016 | Achiwa et al. | |

FOREIGN PATENT DOCUMENTS

| | | |
|---|---|---|
| JP | 60-30860 A | 2/1985 |
| JP | 2015-202849 A | 11/2015 |

OTHER PUBLICATIONS

Official Communication issued in European Patent Application No. 20170271.9, dated May 29, 2020.

* cited by examiner

*Primary Examiner* — Stephen P Avila
(74) *Attorney, Agent, or Firm* — Keating and Bennett, LLP

(57) ABSTRACT

When a shift member is in a first position, a first clutch couples a second drive shaft to a first drive shaft. When the shift member is in the first position, a second clutch decouples a first gear from the first drive shaft. When the shift member is in the first position, a third clutch decouples a second gear from the second drive shaft.

15 Claims, 8 Drawing Sheets

OUTBOARD MOTOR

CROSS REFERENCE TO RELATED APPLICATIONS

This application claims the benefit of priority to Japanese Patent Application No. 2019-126057 filed on Jul. 5, 2019. The entire contents of this application are hereby incorporated herein by reference.

BACKGROUND OF THE INVENTION

1. Field of the Invention

The present invention relates to an outboard motor.

2. Description of the Related Art

An outboard motor includes a drive shaft and a shift mechanism. Rotation of the drive shaft is transmitted to a propeller shaft, while being switched in direction by the shift mechanism. Accordingly, the rotation of the propeller shaft is switched between a forward moving direction and a backward moving direction.

For example, a shift mechanism, described in Japan Laid-open Patent Application Publication No. 2015-202849, includes an upper gear, an intermediate gear, a lower gear and a dog clutch. The upper gear is connected to a first input shaft. The dog clutch is unitarily rotated with a second input shaft. The intermediate gear is constantly meshed with the upper gear and the lower gear. When moved upward, the dog clutch is engaged with the upper gear. Accordingly, the rotation of the first input shaft is transmitted to the second input shaft through the upper gear and the dog clutch. When moved downward, the dog clutch is engaged with the lower gear. Accordingly, the rotation of the first input shaft is transmitted to the second input shaft through the upper gear, the intermediate gear, the lower gear and the dog clutch.

In the outboard motor described above, the intermediate gear is used for transmitting rotation in one of forward movement and backward movement without being used for transmitting rotation in the other. However, the intermediate gear is constantly rotated by the rotation transmitted thereto from the drive shaft in both forward movement and backward movement. Because of this, high abrasion resistance is demanded for the intermediate gear.

SUMMARY OF THE INVENTION

Preferred embodiments of the present invention provide enhanced abrasion resistance of a gear used to transmit rotation outputted from a drive shaft in an outboard motor.

According to a preferred embodiment of the present invention, an outboard motor includes an engine, a first drive shaft, a second drive shaft, a shifter, a propeller shaft, and a transmission. The first drive shaft is connected to the engine and extends in an up-and-down direction. The second drive shaft extends in the up-and-down direction. The shifter switches a direction of rotation to be transmitted therethrough from the first drive shaft to the second drive shaft. The propeller shaft extends in a back-and-forth direction. The transmission transmits the rotation transmitted to the second drive shaft to the propeller shaft.

The shifter includes a first gear, a second gear, a third gear, a shift member, a first clutch, a second clutch, and a third clutch. The first gear is concentric with the first drive shaft. The first gear is rotatable relative to the first drive shaft. The second gear is concentric with the second drive shaft. The second gear is rotatable relative to the second drive shaft. The third gear is connected to the first gear and the second gear. The third gear reverses the direction of the rotation transmitted to the first gear in transmitting the rotation of the first gear to the second gear. The shift member is movable to a first position and a second position.

The first clutch is connected to the shift member. When the shift member is in the first position, the first clutch couples the second drive shaft to the first drive shaft. When the shift member is in the second position, the first clutch decouples the second drive shaft from the first drive shaft. The second clutch is connected to the shift member. When the shift member is in the first position, the second clutch decouples the first gear from the first drive shaft. When the shift member is in the second position, the second clutch couples the first gear to the first drive shaft. The third clutch is connected to the shift member. When the shift member is in the first position, the third clutch decouples the second gear from the second drive shaft. When the shift member is in the second position, the third clutch couples the second gear to the second drive shaft.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
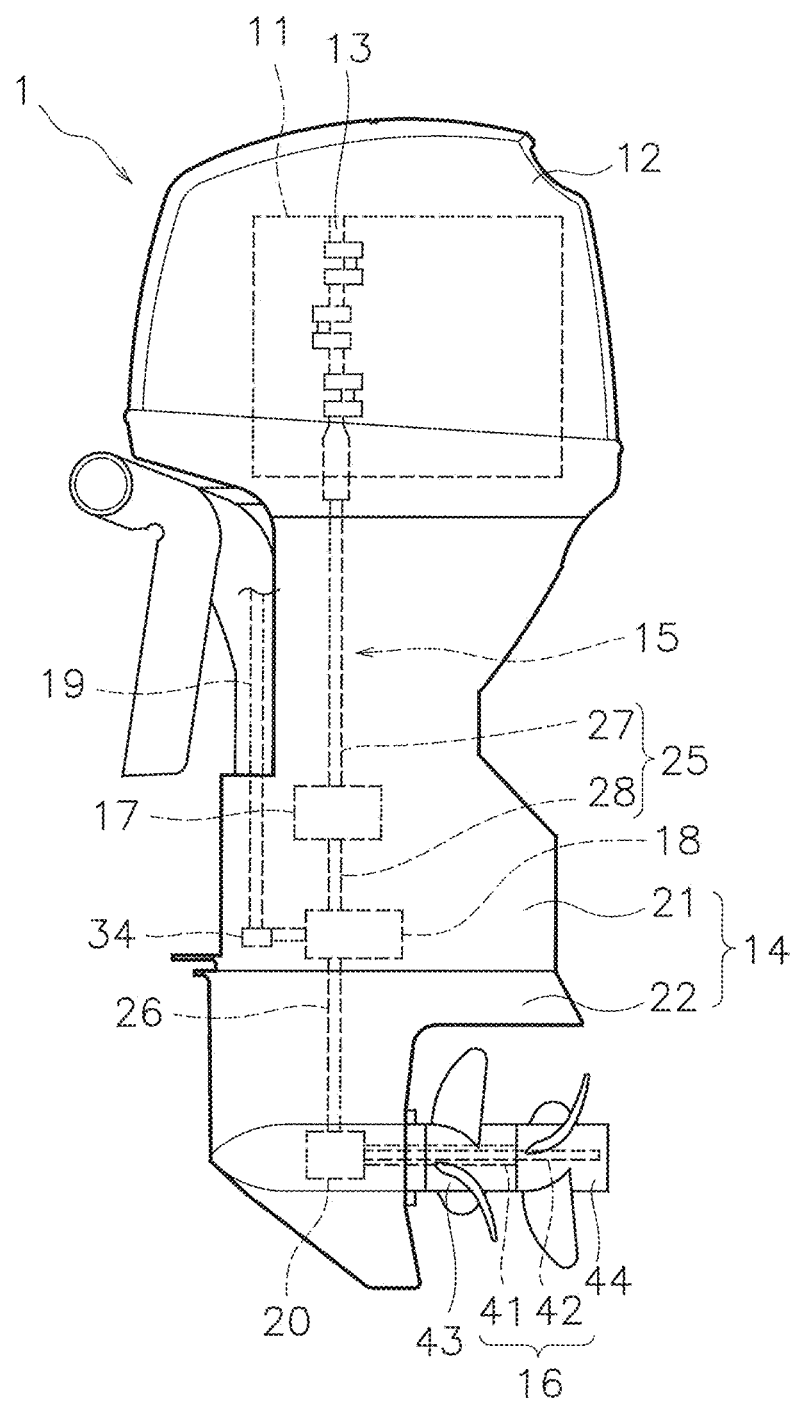
FIG. 1 is a side view of an outboard motor according to a preferred embodiment of the present invention.

Preferred embodiments of the present invention will be hereinafter explained with reference to drawings. FIG. 1 is a side view of an outboard motor 1 according to a preferred embodiment of the present invention. The outboard motor 1 is attached to the stern of a watercraft. As shown in FIG. 1, the outboard motor 1 includes an engine 11 and an engine cover 12. The engine 11 generates a thrust to propel the watercraft. The engine 11 is disposed inside the engine cover 12. The engine 11 includes a crankshaft 13. The crankshaft 13 extends in an up-and-down direction.

The outboard motor 1 includes a housing 14, a drive shaft 15, a propeller shaft 16, a clutch 17, a shifter 18, a shift shaft 19, and a transmission 20. The drive shaft 15, the propeller shaft 16, the clutch 17, the shifter 18, the shift shaft 19, and the transmission 20 are disposed inside the housing 14. The housing 14 includes an upper housing 21 and a lower housing 22. The lower housing 22 is disposed below the upper housing 21. The drive shaft 15 is connected to the crankshaft 13. The drive shaft 15 extends in the up-and-down direction.

Figure 2:
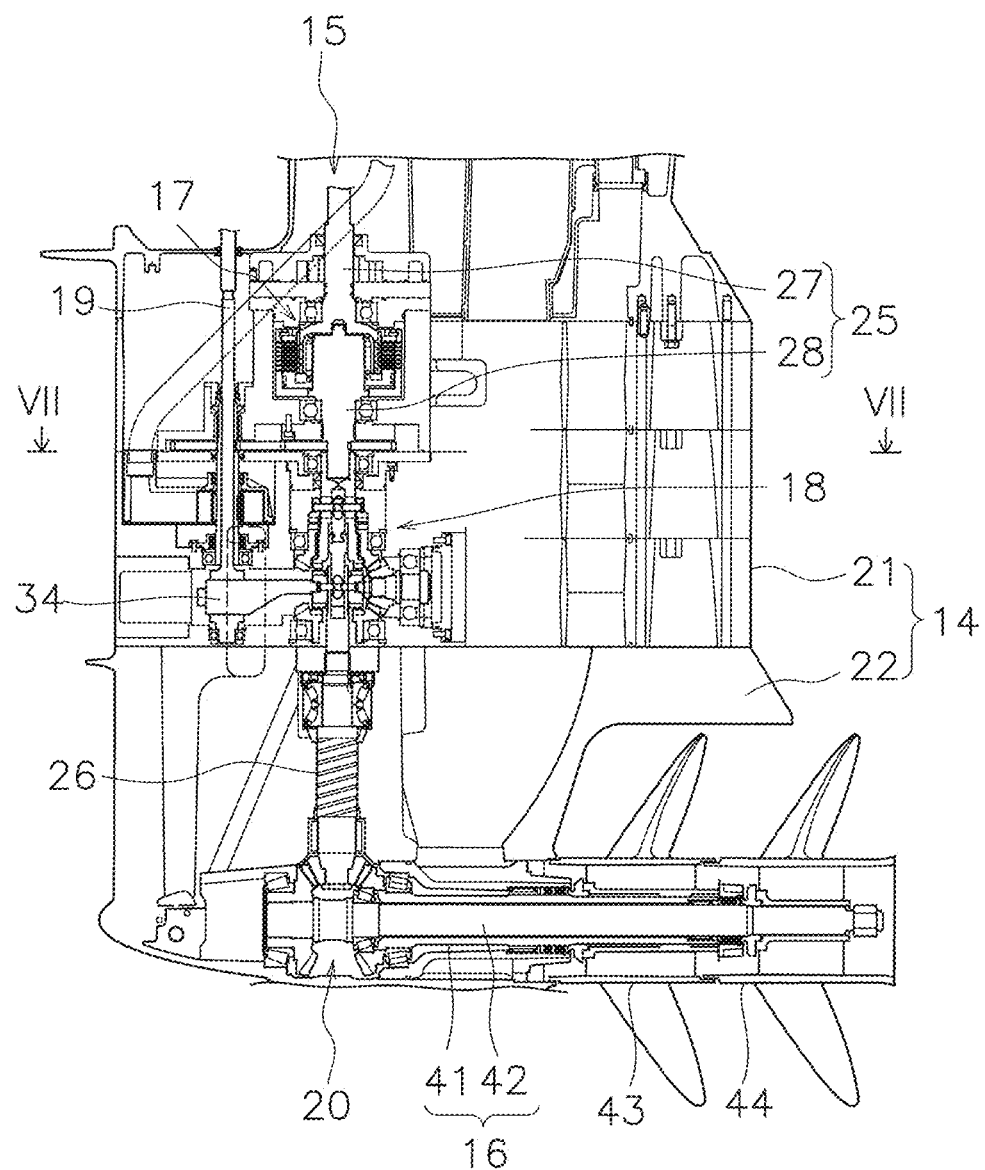
FIG. 2 is a cross-sectional side view of a lower portion of the outboard motor.

FIG. 2 is a cross-sectional side view of a lower portion of the outboard motor 1. As shown in FIG. 2, the drive shaft 15 includes a first drive shaft 25 and a second drive shaft 26. The first drive shaft 25 is connected to the crankshaft 13. The first drive shaft 25 includes an upper shaft 27 and a lower shaft 28. The upper shaft 27 and the lower shaft 28 extend in the up-and-down direction. The upper shaft 27 is connected to the crankshaft 13. The lower shaft 28 is disposed below the upper shaft 27. The lower shaft 28 is concentric with the upper shaft 27. The lower shaft 28 is connected to the upper shaft 27 through the clutch 17.

The clutch 17 is disposed between the upper shaft 27 and the lower shaft 28. The clutch 17 is switched between an engaged state and a disengaged state. When the clutch 17 is in the engaged state, the lower shaft 28 is connected to the upper shaft 27. When the clutch 17 is in the disengaged state, the lower shaft 28 is disconnected from the upper shaft 27. For example, the clutch 17 includes a plurality of clutch discs. When the plurality of clutch discs make contact with each other, the clutch 17 is switched to the engaged state. When the plurality of clutch discs separate from each other, the clutch 17 is switched to the disengaged state.

The second drive shaft 26 is disposed below the first drive shaft 25. The axis of the first drive shaft 25 and that of the second drive shaft 26 are oriented in an identical direction. The second drive shaft 26 is concentric with the first drive shaft 25. The second drive shaft 26 is connected to the first drive shaft 25 through the shifter 18. More specifically, the second drive shaft 26 is connected to the lower shaft 28 of the first drive shaft 25 through the shifter 18.

Figure 3:
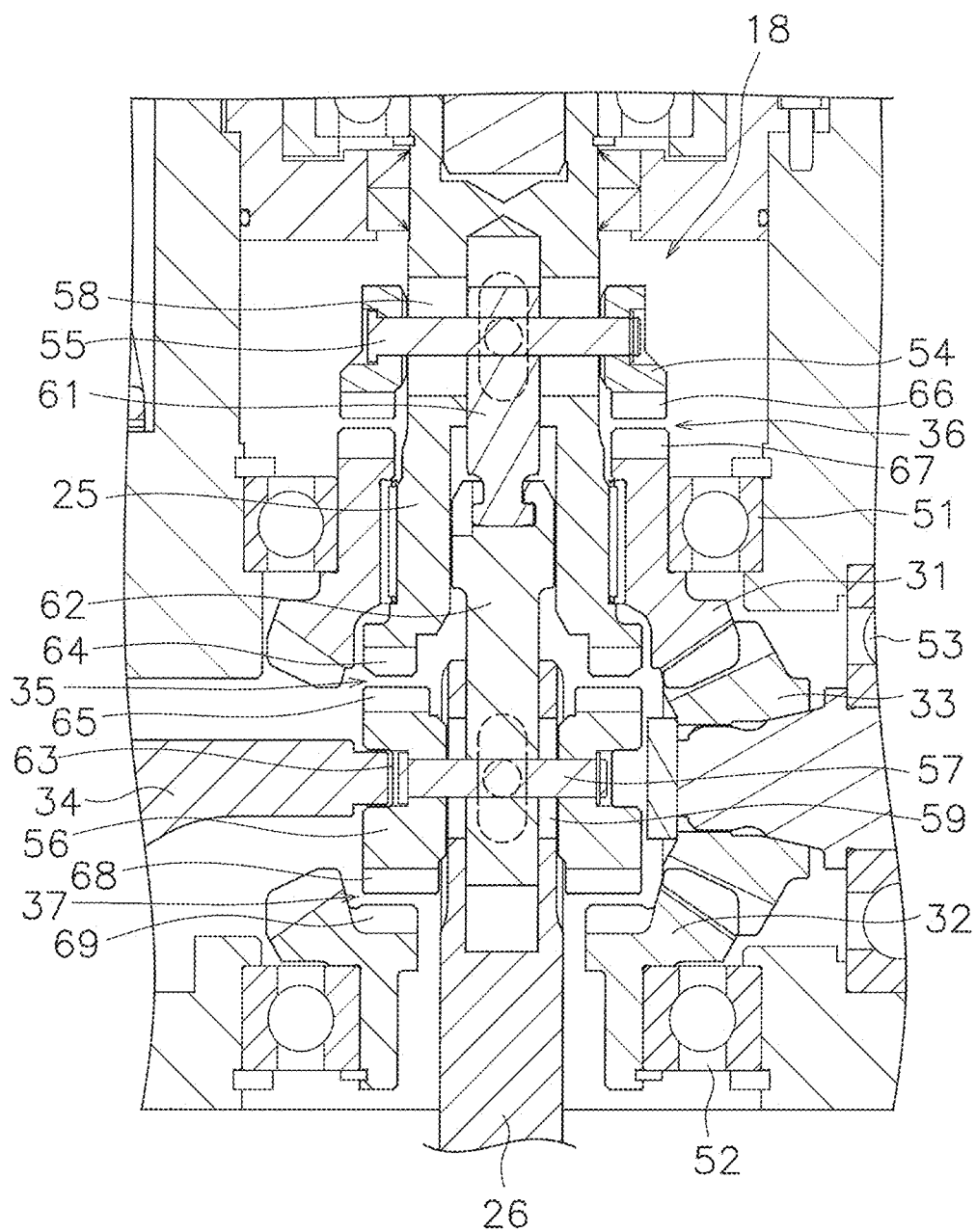
FIG. 3 is a cross-sectional side view of a shifter and the surroundings thereof.
Figure 4:
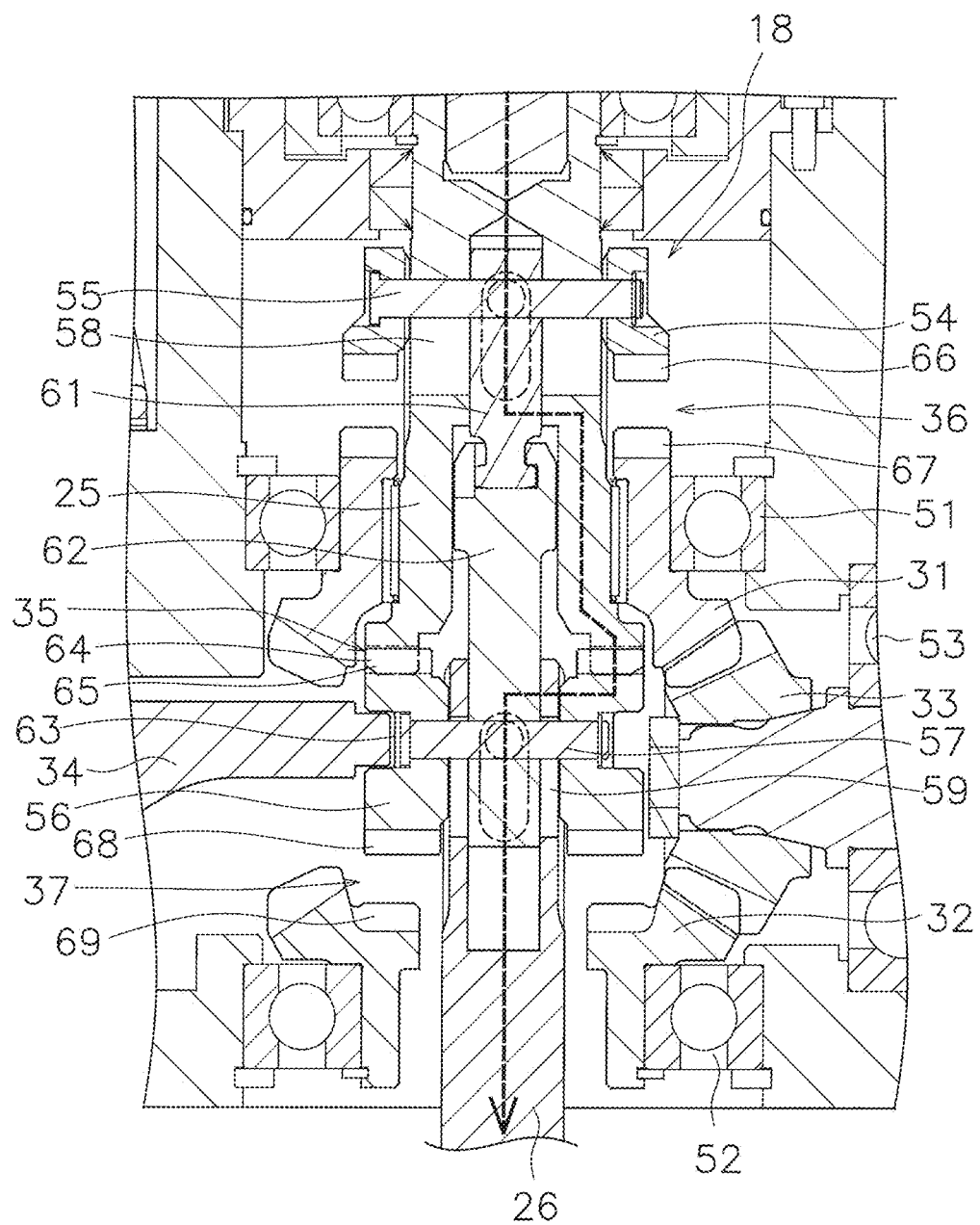
FIG. 4 is a cross-sectional side view of the shifter and the surroundings thereof.
Figure 5:
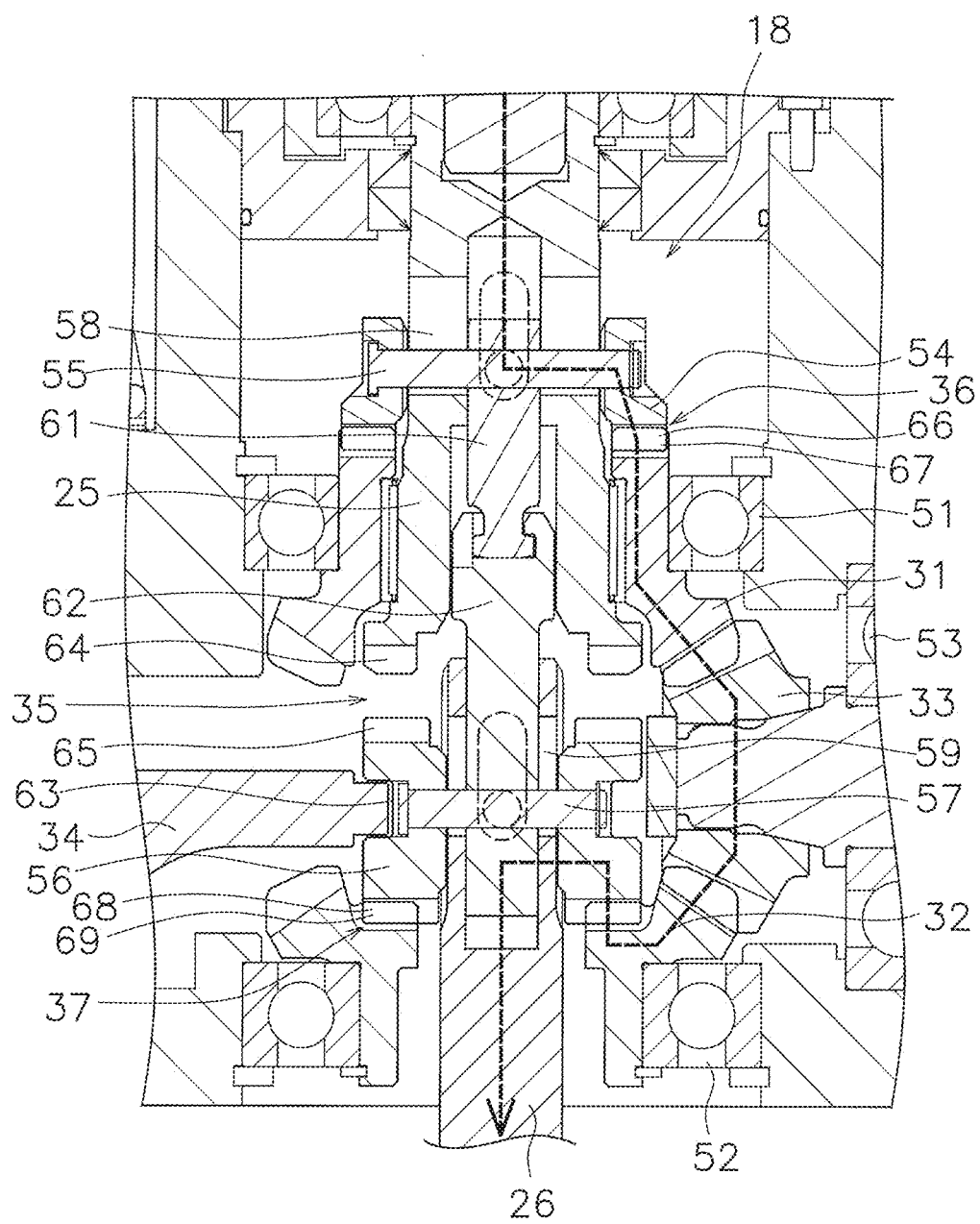
FIG. 5 is a cross-sectional side view of the shifter and the surroundings thereof.

The shifter 18 is disposed between the first drive shaft 25 and the second drive shaft 26. The shifter 18 is disposed inside the upper housing 21. The shifter 18 switches the direction of rotation to be transmitted from the first drive shaft 25 to the second drive shaft 26 between a forward moving direction and a backward moving direction. FIGS. 3 to 5 are close-up side views of the shifter 18 and the surroundings thereof. As shown in FIG. 3, the shifter 18 includes a first gear 31, a second gear 32, a third gear 33, a shift member 34, a first clutch 35, a second clutch 36, and a third clutch 37.

The first gear 31 is concentric with the first drive shaft 25. The first gear 31 is disposed on the outer periphery of the first drive shaft 25. The first gear 31 is rotatably supported by a bearing 51. The first gear 31 is rotatable relative to the first drive shaft 25. The second gear 32 is concentric with the second drive shaft 26. The second gear 32 is disposed on the outer periphery of the second drive shaft 26. The second gear 32 is rotatably supported by a bearing 52. The second gear 32 is rotatable relative to the second drive shaft 26. The axis of the first gear 31 and that of the second gear 32 extend in the up-and-down direction.

The third gear 33 is connected to the first gear 31 and the second gear 32. The axis of the third gear 33 extends in a back-and-forth direction. The third gear 33 is rotatably supported by a bearing 53. The third gear 33 reverses the rotation of the first gear 31 and transmits the reversed rotation to the second gear 32. The first to third gears 31 to 33 are preferably bevel gears. The first gear 31 is meshed with the third gear 33. The third gear 33 is meshed with the second gear 32.

The shift member 34 is movable in the direction of the axis of the second drive shaft 26. In other words, the shift member 34 is movable in the up-and-down direction. The shift member 34 is connected to the shift shaft 19. The shift shaft 19 extends in the up-and-down direction. The shift shaft 19 may be connected to an actuator (not shown in the drawings). The actuator may be, for instance, an electric motor. The shift shaft 19 may be driven by the actuator in response to a shift operation performed by an operator. Alternatively, the shift shaft 19 may be connected to a shift cable. The shift shaft 19 may be driven by the shift cable in response to the shift operation performed by the operator.

The shift shaft 19 moves the shift member 34 to a first position, a second position, and a third position. For example, the shift shaft 19 includes a cam (not shown in the drawings). When the shift shaft 19 is rotated in one direction about the axis thereof, the cam elevates the shift member 34. When the shift shaft 19 is rotated in the other direction about the axis thereof, the cam lowers the shift member 34.

The shifter 18 includes a first movable member 54, a first coupling member 55, a second movable member 56, and a second coupling member 57. The first movable member 54 is disposed on the outer periphery of the first drive shaft 25. The first movable member 54 and the first coupling member 55 are disposed above the first gear 31. The first movable member 54 is coupled to the first drive shaft 25 through the first coupling member 55. The first movable member 54 and the first coupling member 55 are rotated together with the first drive shaft 25. The first drive shaft 25 includes an elongated hole 58 elongated in the direction of the axis of the first drive shaft 25. The first coupling member 55 is inserted into the elongated hole 58 of the first drive shaft 25. The first coupling member 55 is movable in the axial direction of the first drive shaft 25 along the elongated hole 58 of the first drive shaft 25. Therefore, the first movable member 54 and the first coupling member 55 are movable in the axial direction of the first drive shaft 25.

The second movable member 56 is disposed on the outer periphery of the second drive shaft 26. The second movable member 56 and the second coupling member 57 are disposed between the first gear 31 and the second gear 32. The second movable member 56 is coupled to the second drive shaft 26 through the second coupling member 57. The second movable member 56 and the second coupling member 57 are rotated together with the second drive shaft 26. The second drive shaft 26 includes an elongated hole 59 elongated in the axial direction of the second drive shaft 26. The second coupling member 57 is inserted into the elongated hole 59 of the second drive shaft 26. The second coupling member 57 is movable in the axial direction of the second drive shaft 26 along the elongated hole 59 of the second drive shaft 26. Therefore, the second movable member 56 and the second coupling member 57 are movable in the axial direction of the second drive shaft 26.

The shifter 18 includes a first movable shaft 61 and a second movable shaft 62. The first movable shaft 61 is disposed inside the first drive shaft 25. The first movable shaft 61 is movable in the axial direction of the first drive shaft 25 with respect to the first drive shaft 25. The first movable shaft 61 is connected to the first movable member 54 through the first coupling member 55. The first coupling member 55 is moved together with the first movable shaft 61 in the axial direction of the first drive shaft 25.

The second movable shaft 62 is disposed at least partially inside the second drive shaft 26. The second movable shaft 62 protrudes upward from the second drive shaft 26. The second movable shaft 62 is connected at an upper portion thereof to the first movable shaft 61. The second movable shaft 62 is rotatable about the axis of the second drive shaft 26 with respect to the first movable shaft 61. The second movable shaft 62 is movable in the axial direction of the second drive shaft 26 with respect to the second drive shaft 26. The second movable shaft 62 is connected to the second movable member 56 through the second coupling member 57. The second coupling member 57 is moved together with the second movable shaft 62 in the axial direction of the second drive shaft 26.

The second movable member 56 is movable up and down in conjunction with the first movable member 54. The second movable member 56 is connected to the shift member 34. The second movable member 56 is provided with a recess 63 on the outer peripheral surface thereof. The recess 63 extends in the circumferential direction of the second movable member 56. The distal end of the shift member 34 is disposed inside the recess 63. When the shift member 34 is moved up and down, the shift member 34 presses up and down the first movable member 54. Accordingly, the first movable member 54 and the second movable member 56 are moved up and down.

The first to third clutches 35 to 37 are preferably dog clutches, for example. However, the first to third clutches 35 to 37 are not limited to dog clutches and may be another type of clutch. The first clutch 35 is connected to the shift member 34. The first clutch 35 includes first clutch teeth 64 and second clutch teeth 65. The first clutch teeth 64 are provided on the first drive shaft 25. The first clutch teeth 64 are rotated together with the first drive shaft 25. The second clutch teeth 65 are provided on the second movable member 56. The second clutch teeth 65 are rotated together with the second movable member 56. The second clutch teeth 65 are moved together with the second movable member 56 in the up-and-down direction.

When the second movable member 56 is moved upward in accordance with the motion of the shift member 34, the second clutch teeth 65 are moved toward the first clutch teeth 64. The second clutch teeth 65 are then meshed with the first clutch teeth 64 such that the first clutch 35 couples the second drive shaft 26 to the first drive shaft 25. Therefore, when the shift member 34 is in the first position shown in FIG. 4, the first clutch 35 couples the second drive shaft 26 to the first drive shaft 25. When the shift member 34 is in either the third position shown in FIG. 3 or the second position shown in FIG. 5, the first clutch 35 decouples the second drive shaft 26 from the first drive shaft 25. The second position is located below the first position. The third position is located between the first position and the second position.

The second clutch 36 is connected to the shift member 34 through the first movable shaft 61, the second movable shaft 62, and the second movable member 56. The third gear 33 is located at least partially at a height equal to a height of the first clutch 35 in the up-and-down direction of the outboard motor 1. The second clutch 36 includes third clutch teeth 66 and fourth clutch teeth 67. The third clutch teeth 66 are provided on the first movable member 54. The third clutch teeth 66 are moved together with the first movable member 54 in the up-and-down direction. The third clutch teeth 66 are rotated together with the first drive shaft 25. The fourth clutch teeth 67 are provided on the first gear 31. The fourth clutch teeth 67 are rotated together with the first gear 31.

When the first and second movable shafts 61 and 62 are moved downward in accordance with the motion of the shift member 34, the third clutch teeth 66 are moved toward the fourth clutch teeth 67. The third clutch teeth 66 are then meshed with the fourth clutch teeth 67 such that the second clutch 36 couples the first gear 31 to the first drive shaft 25. Therefore, when the shift member 34 is in the second position shown in FIG. 5, the second clutch 36 couples the first gear 31 to the first drive shaft 25. When the shift member 34 is in either the third position shown in FIG. 3 or the first position shown in FIG. 4, the second clutch 36 decouples the first gear 31 from the first drive shaft 25.

The third clutch 37 is connected to the shift member 34. The third gear 33 is located at least partially at a height equal to a height of the third clutch 37 in the up-and-down direction of the outboard motor 1. The third clutch 37 includes fifth clutch teeth 68 and sixth clutch teeth 69. The fifth clutch teeth 68 are provided on the second movable member 56. The fifth clutch teeth 68 are rotated together with the second drive shaft 26. The fifth clutch teeth 68 are moved together with the second movable member 56 in the up-and-down direction. The sixth clutch teeth 69 are provided on the second gear 32. The sixth clutch teeth 69 are rotated together with the second gear 32.

When the second movable member 56 is moved downward in accordance with the motion of the shift member 34, the fifth clutch teeth 68 are moved toward the sixth clutch teeth 69. The fifth clutch teeth 68 are then meshed with the sixth clutch teeth 69 such that the third clutch 37 couples the second gear 32 to the second drive shaft 26. Therefore, when the shift member 34 is in the second position shown in FIG. 5, the third clutch 37 couples the second gear 32 to the second drive shaft 26. When the shift member 34 is in either the first position shown in FIG. 4 or the third position shown in FIG. 3, the third clutch 37 decouples the second gear 32 from the second drive shaft 26.

As shown in FIG. 3, when the shift member 34 is in the third position, the first clutch 35 decouples the second drive shaft 26 from the first drive shaft 25. The second clutch 36 decouples the first gear 31 from the first drive shaft 25. Besides, the third clutch 37 decouples the second gear 32 from the second drive shaft 26. Due to the above, the rotation of the first drive shaft 25 is not transmitted to the second drive shaft 26. Additionally, the rotation of the first drive shaft 25 is not transmitted to the first to third gears 31 to 33.

When the shift member 34 is moved from the third position to the first position, the first movable member 54 and the second movable member 56 are both moved upward. As shown in FIG. 4, when the shift member 34 is in the first position, the first clutch 35 couples the second drive shaft 26 to the first drive shaft 25. The second clutch 36 decouples the first gear 31 from the first drive shaft 25. Additionally, the third clutch 37 decouples the second gear 32 from the second drive shaft 26. Due to the above, the rotation of the first drive shaft 25 is transmitted to the second drive shaft 26 through the first clutch 35. Therefore, the second drive shaft 26 is rotated in the forward moving direction that is identical to the rotational direction of the first drive shaft 25. On the other hand, the rotation of the first drive shaft 25 is not transmitted to the first to third gears 31 to 33.

When the shift member 34 is moved from the third position to the second position, the first movable member 54 and the second movable member 56 are both moved downward. As shown in FIG. 5, when the shift member 34 is in the second position, the first clutch 35 decouples the second drive shaft 26 from the first drive shaft 25. The second clutch 36 connects the first gear 31 to the first drive shaft 25. Additionally, the third clutch 37 connects the second gear 32 to the second drive shaft 26. Due to the above, the rotation of the first drive shaft 25 is transmitted to the second drive shaft 26 through the second clutch 36, the first gear 31, the third gear 33, the second gear 32, and the third clutch 37. Therefore, the second drive shaft 26 is rotated in the backward moving direction that is opposite from the rotational direction of the first drive shaft 25.

Figure 6:
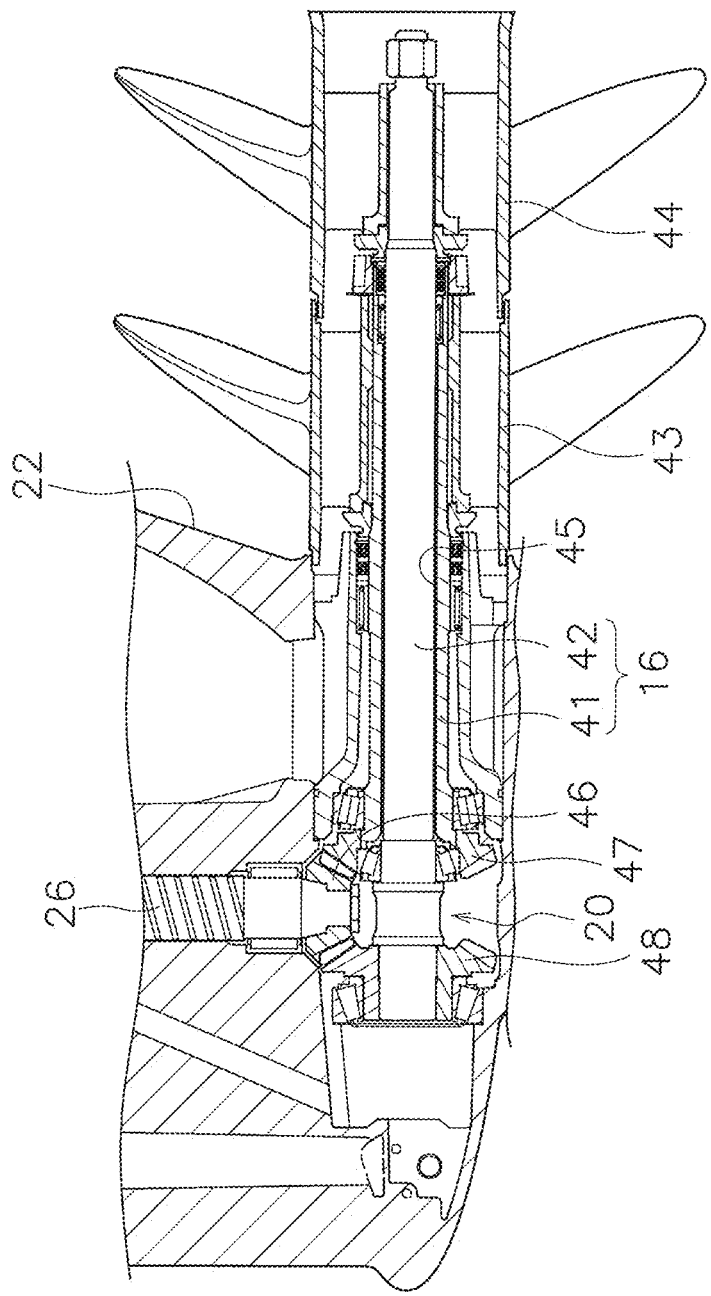
FIG. 6 is a cross-sectional side view of a propeller shaft and a transmission.

FIG. 6 is a close-up side view of the propeller shaft 16 and the transmission 20. The propeller shaft 16 and the transmission 20 are disposed inside the lower housing 22. The propeller shaft 16 extends in the back-and-forth direction. The propeller shaft 16 is connected to the second drive shaft 26 through the transmission 20. The propeller shaft 16 includes a first propeller shaft 41 and a second propeller shaft 42. A first propeller 43 is attached to the first propeller shaft 41. A second propeller 44 is attached to the second propeller shaft 42.

The second propeller shaft 42 is concentric with the first propeller shaft 41. The first propeller shaft 41 includes a hole 45 extending in the back-and-forth direction. The hole 45 of the first propeller shaft 41 penetrates the first propeller shaft 41 in the direction of the axis of the first propeller shaft 41. The second propeller shaft 42 is inserted into the hole 45 of the first propeller shaft 41. The second propeller shaft 42 protrudes forward from the first propeller shaft 41. The second propeller shaft 42 protrudes backward from the first propeller shaft 41.

The transmission 20 transmits rotation of the second drive shaft 26 to the first propeller shaft 41 and the second propeller shaft 42. The transmission 20 includes a first bevel gear 46, a second bevel gear 47, and a third bevel gear 48. The first bevel gear 46 is fixed to the second drive shaft 26. The second bevel gear 47 is meshed with the first bevel gear 46. The second bevel gear 47 is fixed to the first propeller shaft 41. The third bevel gear 48 is meshed with the first bevel gear 46. The third bevel gear 48 is fixed to the second propeller shaft 42. The third bevel gear 48 transmits rotation of the first bevel gear 46 to the second propeller shaft 42 such that the transmitted rotation is oriented in the opposite direction from the rotation of the first propeller shaft 41. Therefore, the first and second propeller shafts 41 and 42 are rotated in opposite directions. Fins of the second propeller 44 are twisted in the opposite direction from those of the first propeller 43. Therefore, when the first and second propeller shafts 41 and 42 are rotated in the opposite directions, a thrust generated by the first propeller shaft 41 and that generated by the second propeller shaft 42 are oriented in an identical direction.

In the outboard motor 1 according to the preferred embodiments described above, when the shift member 34 is in the second position, the rotation of the first drive shaft 25 is transmitted to the second drive shaft 26 through the second clutch 36, the first gear 31, the third gear 33, the second gear 32, and the third clutch 37. When the shift member 34 is in the first position, the rotation of the first drive shaft 25 is transmitted to the second drive shaft 26 through the first clutch 35 but is not transmitted to the first to third gears 31 to 33. Due to this, the first to third gears 31 to 33 have enhanced abrasion resistance.

Figure 7:
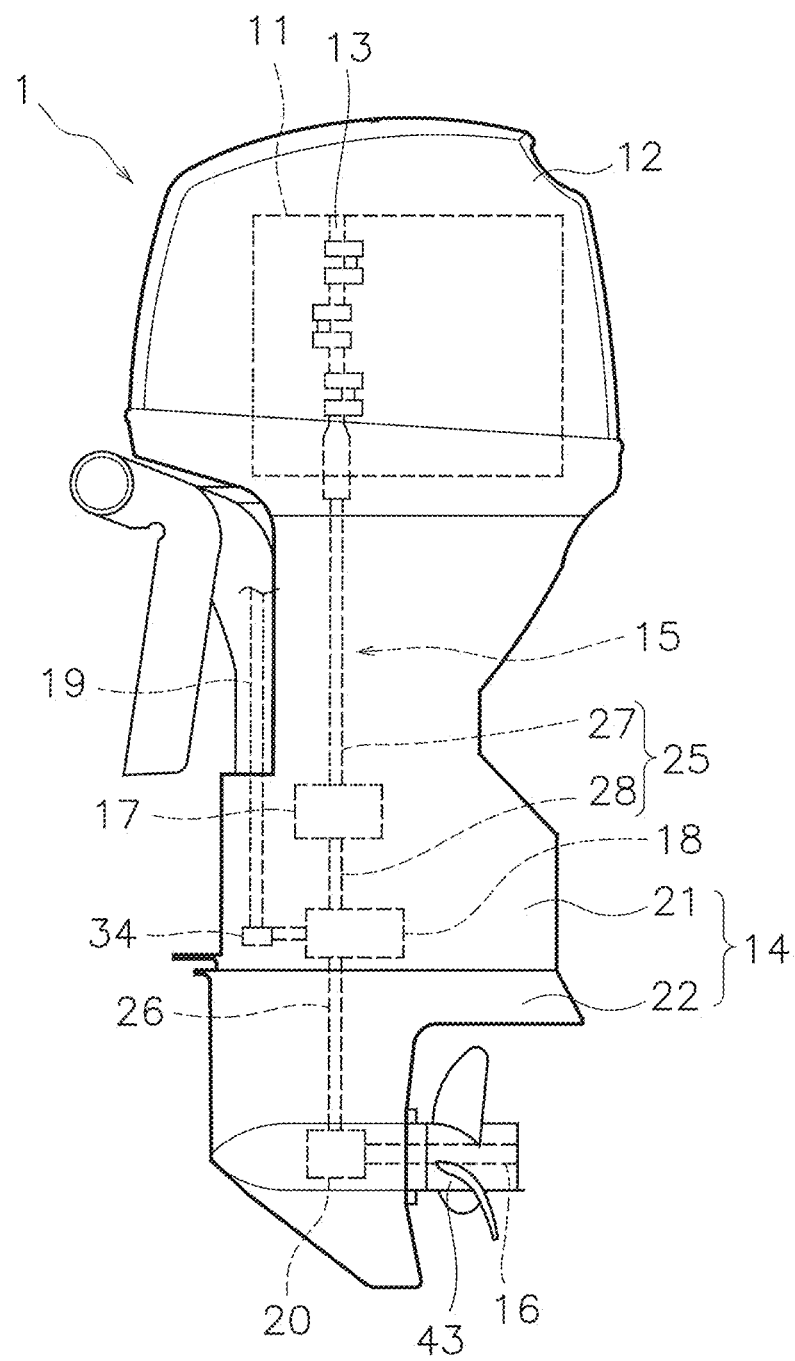
FIG. 7 is a side view of an outboard motor according to a first modified preferred embodiment of the present invention.

In the above-described preferred embodiments, the outboard motor 1 preferably includes two propellers. However, as shown in FIG. 7, the outboard motor 1 may include only one propeller. The structure and/or layout of the shifter 18 may not be limited to those/that in the above-described preferred embodiments and may be changed. For example, the first to third gears 31 to 33 may not be limited to the bevel gears and may be another type of gear.

Figure 8:
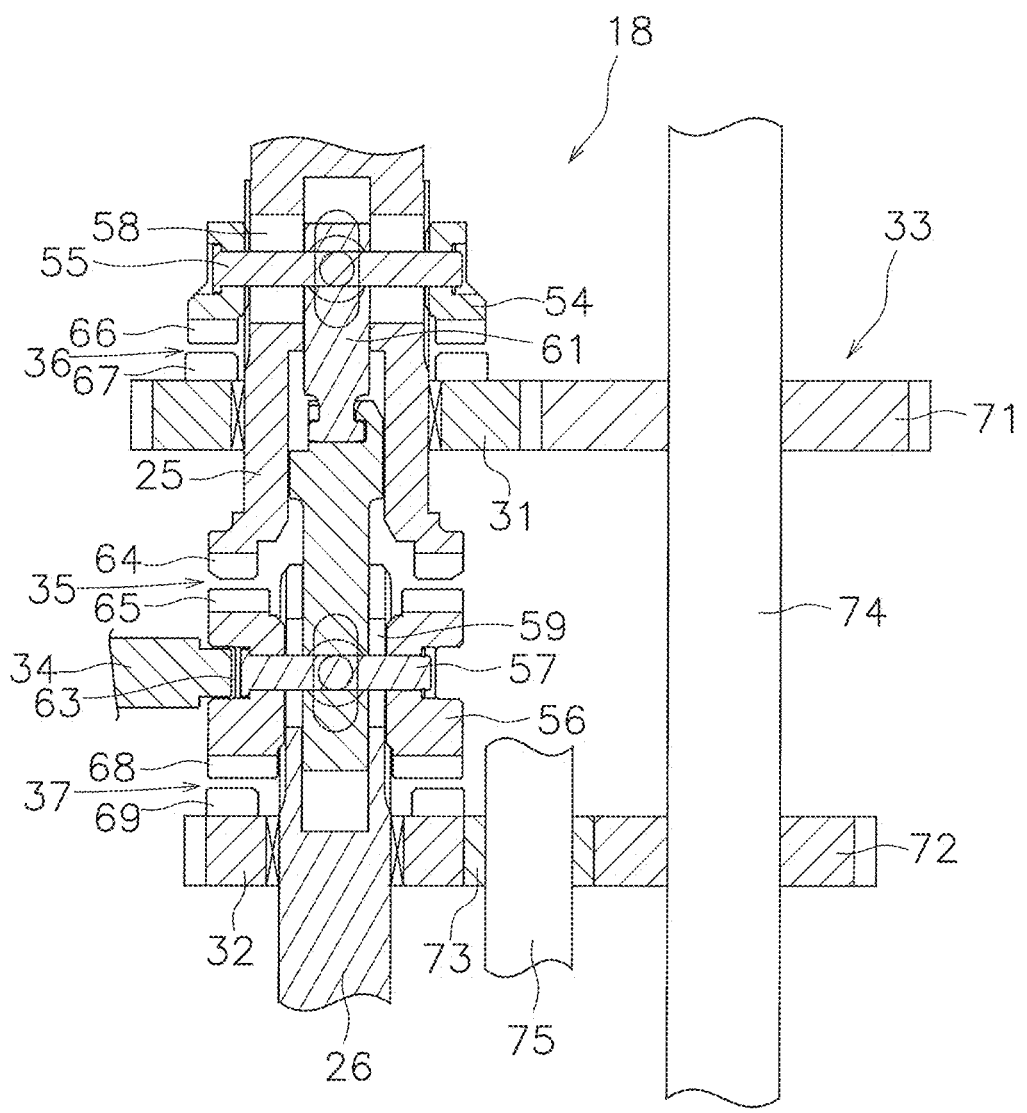
FIG. 8 is a cross-sectional side view of a shifter according to a second modified preferred embodiment of the present invention.

FIG. 8 is a view of the shifter 18 according to a modified preferred embodiment of the present invention. As shown in FIG. 8, the first and second gears 31 and 32 are spur gears, for example. The third gear 33 includes a plurality of gears 71 to 73. The gears 71 to 73 are spur gears. The gears 71 and 72 are fixed to a shaft 74. The gear 73 is fixed to a shaft 75. The gear 71 is meshed with the first gear 31. The gear 72 is meshed with the gear 73. The gear 73 is meshed with the second gear 32.

In the above-described preferred embodiments, when the shift member 34 is in the first position, the second drive shaft 26 is rotated in the forward moving direction. By contrast, when the shift member 34 is in the second position, the second drive shaft 26 is rotated in the backward moving direction. However, when the shift member 34 is in the second position, the second drive shaft 26 may be rotated in the forward moving direction. By contrast, when the shift member 34 is in the first position, the second drive shaft 26 may be rotated in the backward moving direction.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
   an engine;
   a first drive shaft connected to the engine and extending in an up-and-down direction of the outboard motor;
   a second drive shaft extending in the up-and-down direction;
   a shifter to switch a direction of rotation to be transmitted from the first drive shaft to the second drive shaft;
   a propeller shaft extending in a back-and-forth direction of the outboard motor; and
   a transmission to transmit the rotation of the second drive shaft to the propeller shaft; wherein
   the shifter includes:
      a first gear concentric with the first drive shaft and rotatable relative to the first drive shaft;
      a second gear concentric with the second drive shaft and rotatable relative to the second drive shaft;
      a third gear connected to the first gear and the second gear to reverse the direction of the rotation transmitted from the first gear to the second gear;
      a shift member movable to a first position and a second position;
      a first clutch connected to the shift member to couple the second drive shaft to the first drive shaft when the shift member is in the first position, and to decouple the second drive shaft from the first drive shaft when the shift member is in the second position;
      a second clutch connected to the shift member to decouple the first gear from the first drive shaft when the shift member is in the first position, and to couple the first gear to the first drive shaft when the shift member is in the second position; and
      a third clutch connected to the shift member to decouple the second gear from the second drive shaft when the shift member is in the first position, and to couple the second gear to the second drive shaft when the shift member is in the second position.

2. The outboard motor according to claim 1, wherein an axis of the first drive shaft and an axis of the second drive shaft are oriented in an identical direction.

3. The outboard motor according to claim 1, wherein the first clutch is disposed on an outer periphery of the first drive shaft.

4. The outboard motor according to claim 1, wherein the second clutch is disposed on an outer periphery of the second drive shaft.

5. The outboard motor according to claim 1, wherein the first gear is disposed on an outer periphery of the first drive shaft.

6. The outboard motor according to claim 1, wherein the second gear is disposed on an outer periphery of the second drive shaft.

7. The outboard motor according to claim 1, wherein the third gear is located at least partially at a height equal to a height of the first clutch in the up-and-down direction.

8. The outboard motor according to claim 1, wherein the third gear is located at least partially at a height equal to a height of the third clutch in the up-and-down direction.

9. The outboard motor according to claim 1, wherein
the first clutch and the third clutch are included in a movable member connected to the shift member; and
the movable member is located at least partially between the first gear and the second gear.

10. The outboard motor according to claim 1, wherein
the first clutch is movable in a direction of an axis of the first drive shaft; and
the first clutch couples the second drive shaft to the first drive shaft by moving toward the first drive shaft in the direction of the axis of the first drive shaft in accordance with a motion of the shift member.

11. The outboard motor according to claim 1, wherein
the second clutch is movable in a direction of an axis of the first drive shaft; and
the second clutch couples the first gear to the first drive shaft by moving toward the first gear in the direction of the axis of the first drive shaft in accordance with a motion of the shift member.

12. The outboard motor according to claim 1, wherein
the third clutch is movable in a direction of an axis of the second drive shaft; and
the third clutch couples the second gear to the second drive shaft by moving toward the second gear in the direction of the axis of the second drive shaft in accordance with a motion of the shift member.

13. The outboard motor according to claim 1, wherein
the shifter includes:
a first movable member movable in a direction of an axis of the first drive shaft with respect to the first drive shaft;
a second movable member movable in a direction of an axis of the second drive shaft with respect to the second drive shaft; and
a movable shaft to couple the first movable member and the second movable member;
the second clutch is included in the first movable member;
the first clutch and the third clutch are included in the second movable member; and
the first movable member and the second movable member are moved in an identical direction.

14. The outboard motor according to claim 1, wherein
the second clutch is disposed above the first gear and is movable on the first drive shaft in a direction of an axis of the first drive shaft; and
the first clutch and the third clutch are movable on the second drive shaft in a direction of an axis of the second drive shaft.

15. The outboard motor according to claim 1, wherein
the shift member is movable to a third position; and
when the shift member is at the third position:
the first clutch decouples the second drive shaft from the first drive shaft;
the second clutch decouples the first gear from the first drive shaft; and
the third clutch decouples the second gear from the second drive shaft.

\* \* \* \* \*